(Model.)

H. P. GROSS.
BASKET.

No. 326,499. Patented Sept. 15, 1885.

Witnesses:
Thos. Cornelius
Wm. C. Falck

Inventor:
Henry P. Gross.
Baltimore, Md.

UNITED STATES PATENT OFFICE.

HENRY P. GROSS, OF BALTIMORE, MARYLAND, ASSIGNOR TO PRISCILLA I. GROSS, OF SAME PLACE.

BASKET.

SPECIFICATION forming part of Letters Patent No. 326,499, dated September 15, 1885.

Application filed May 26, 1885. (Model.)

*To all whom it may concern:*

Be it known that I, HENRY P. GROSS, a citizen of the United States, residing at Baltimore city, State of Maryland, have invented certain new and useful Improvements in Baskets; and I do declare the following to be a full, clear, and exact description of the invention, such as will enable others skilled at or in the art to which it appertains to make and use the same, reference being had to the accompanying drawings, which form a part of this specification.

This invention relates to a twisted wire designed for a permanent safety device for the handles of any shape or size baskets, and as a guard against breakage.

Figure 1:
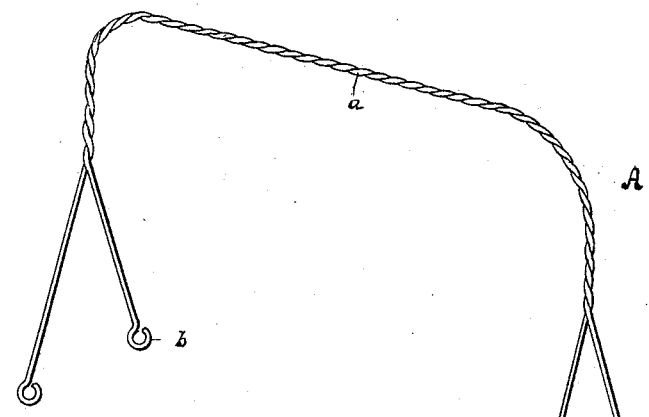
Figure 2:
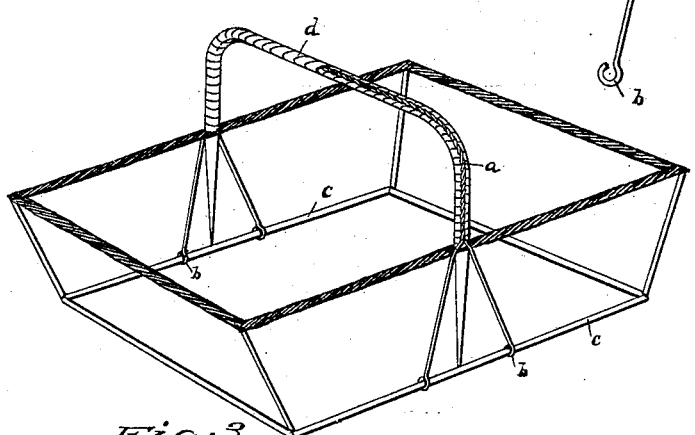
Figure 3:
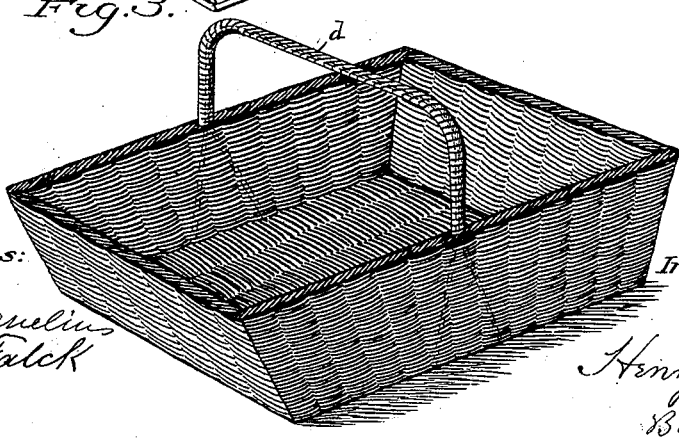

Referring to the drawings, Figure 1 is a perspective view of the wire strengthening device before insertion in the basket. Fig. 2 is a perspective view of the frame of the basket with the strengthening device secured thereto by the eyes $b\ b$, and partially concealed by the wrapping $d$ of the handle. Fig. 3 is a perspective view of the completed basket.

The size of the twisted wire A will be governed by the size of the basket, and it passes through the handle of the basket to the top edge, diverging at the top, and passing down through the sides to the bottom rail, $c$, where it is securely fastened by the eyes $b\ b$. The wire is to be covered by the regular material that baskets are manufactured of, as shown at $d$, thereby making it invisible. I claim that this improvement will double the strength of the ordinary handle, and that any basket with this improvement will carry double the weight without any possibility of the handle breaking or pulling out.

Having thus described my invention, I claim—

1. In combination with the handle of a basket, wires secured to the handle and passing from it in diverging lines along the sides of the basket and secured to the bottom rails, substantially as and for the purpose set forth.

2. In combination with the handle of a basket, wires twisted together for a part of their length and secured to the handle, and passing from it along the sides of the basket and secured to the bottom rails, substantially as and for the purpose set forth.

HENRY P. GROSS.

Witnesses:
 THOS. CORNELIUS,
 GEO. W. HOFFMAN.